(12) United States Patent
Miller

(10) Patent No.: US 8,624,911 B1
(45) Date of Patent: Jan. 7, 2014

(54) TEXTURE-BASED POLYGON ANTIALIASING

(75) Inventor: James B. Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/344,605

(22) Filed: Jan. 5, 2012

Related U.S. Application Data

(60) Provisional application No. 61/430,165, filed on Jan. 5, 2011, provisional application No. 61/430,532, filed on Jan. 6, 2011, provisional application No. 61/559,713, filed on Nov. 14, 2011.

(51) Int. Cl.
*G09G 5/00* (2006.01)

(52) U.S. Cl.
USPC ............ 345/582; 345/581; 345/583; 345/584; 345/587; 345/611; 345/612

(58) Field of Classification Search
USPC ............................ 345/641, 582–588, 611–616
See application file for complete search history.

(56) References Cited

U.S. PATENT DOCUMENTS

| | | | |
|---|---|---|---|
| 4,679,040 A | 7/1987 | Yan | |
| 4,780,711 A | 10/1988 | Doumas | |
| 4,831,447 A | 5/1989 | Lake | |
| 5,255,352 A * | 10/1993 | Falk | 345/582 |
| 5,278,678 A | 1/1994 | Harrington | |
| 5,487,142 A | 1/1996 | Nakayama et al. | |
| 5,548,693 A | 8/1996 | Shinya | |
| 5,561,723 A | 10/1996 | DesJardins et al. | |
| 5,668,940 A | 9/1997 | Steiner et al. | |
| 5,719,595 A * | 2/1998 | Hoddie et al. | 345/611 |
| 6,337,686 B2 | 1/2002 | Wong et al. | |
| 6,466,206 B1 * | 10/2002 | Deering | 345/419 |
| 6,999,100 B1 | 2/2006 | Leather et al. | |
| 2003/0210251 A1 * | 11/2003 | Brown | 345/611 |
| 2004/0189664 A1 * | 9/2004 | Frisken et al. | 345/611 |
| 2007/0273706 A1 * | 11/2007 | Berger | 345/582 |
| 2008/0025641 A1 * | 1/2008 | Lee | 382/296 |
| 2008/0320414 A1 | 12/2008 | Kan et al. | |

* cited by examiner

*Primary Examiner* — Ke Xiao
*Assistant Examiner* — Kim-Thanh T Tran
(74) *Attorney, Agent, or Firm* — Fish & Richardson P.C.

(57) ABSTRACT

A computer-implemented method includes identifying a bit-mapped image of a line or polygon shape; mapping the image to a texture map that is slightly large in at least one dimension than the bit-mapped image; overlaying the bit-mapped image and the texture map; computing pixel shading for pixels between an outer edge of the bit-mapped image and the texture map by measuring a distance from particular ones of the pixels to an idealized line near an edge of the bit-mapped image; and displaying the bit-mapped image with pixels at its edge shaded according to the computed pixel shading.

17 Claims, 7 Drawing Sheets

TEXTURE-BASED POLYGON ANTIALIASING

CROSS-REFERENCE TO RELATED APPLICATIONS

This application claims priority under 35 U.S.C. §119(e) to U.S. Provisional Patent Application Ser. No. 61/430,165, filed on Jan. 5, 2011, to U.S. Provisional Patent Application Ser. No. 61/430,532, filed on Jan. 6, 2011, and to U.S. Provisional Patent Application Ser. No. 61/559,713, filed Nov. 14, 2011, each of which the entire contents are incorporated by reference as if set forth fully herein.

TECHNICAL FIELD

This document relates to mechanisms for antialiasing lines, polygons, and other objects for display on a computer system.

BACKGROUND

Lines or other edges drawn on pixelated video displays are prone to "jaggy" artifacts, where the viewer can see the edge stair-step between the pixels that are drawn with color of the item and the color of the area around the item. For example, if a black box is displayed at a rotation angle of 45 degrees on a white background, all of the edges of the box will have a visible saw-tooth edge if a user of a computing device looks closely. This is a natural outcome of using displays with discrete pixels, because there is no practical way to represent on such displays a continuous line that is diagonal to the pixel layout. Instead, a line is represented just a series of separate pixels, or small rectangular (usually square) areas on the display surface. In short, drawing with squares is not smooth.

This artifact is present in general, but can be particularly noticeable when the pixels on a display are relatively large (for example, on low-resolution or low-dpi displays). The artifact may also be particularly noticeable when a line is drawn at a small angle relative to the pixel layout (e.g., lines close to, but not on, the horizontal and vertical), because the steps are particularly long in such a situation. The problem is how to make lines look smoother, or "antialiased." General antialiasing techniques involve having some pixels represent partial coverage of a line by having translucent variations of the line color. The net effect is that the line "fades out" at the edges, and looks smoother by avoiding having such hard edges between the on-the-line and off-the-line pixels on the display along the stair-step or saw-tooth edge.

SUMMARY

This document discusses systems and techniques for efficient antialiasing of lines and other objects, which may enable effective antialiasing even on devices that have relatively low graphic computing power, such as tablet computers and mobile telephones. The techniques discussed here use GPU shaders or commonly available RGBA texture interpolation features of graphics or CPU hardware to accomplish the task of rendering a line or other object such as the outer periphery of a two-dimensional item that is displayed on a contrasting background. Minimizing the amount of information transmitted down to the GPU helps efficiency, as does minimizing the calculations done by the shaders at the vertex and pixel level.

The techniques provide a fast way to draw visually correct antialiased lines (and other objects) using GPU shaders. They use a small set of data to send down to the shaders (minimizing the bandwidth necessary to get the data there) and a relatively small set of computations to determine how to draw the affected pixels. They also use the graphics engine's interpolator to compute interpolated values for the pixels in between vertices. But they use that interpolated value differently than do other more expensive approaches and they end up requiring far less data to get a similar result compared to other techniques.

By the techniques described here, one first matches a polygon to a texture map that has a high-quality alpha component (such as using RGBA). The polygon is mapped to an area in the texture map that has a shape that matches the shape of the polygon, and a border that has an alpha value that transitions from opaque (e.g., a value of 255) to transparent (e.g., a value of 0) along a small number of pixels around an edge of the polygon. For example, for a line, a quad may be formed around the line that represents the bounding area of the antialiased line (or other rectangular object). This quad will encompass both the opaque region of the line interior as well as the fading antialiased region at the line's edges on the texture map.

For a given rendering of a polygon with antialiased edges, the process then identifies a line along an edge of the polygon (where the line is a construction line used for computations, but is not part of the image and is not displayed). That line may be drawn, for example, between vertices on the ends of a straight edges of the polygon that is to be antialiased, and may pass through or very close to the saw-teeth that make up a diagonal edge of the polygon.

A "distance" float value may then be identified for pixels of the map outside of the polygon. The distance between each such map pixel (e.g., a center point of each pixel) and the line may be conveniently computed, and may be used to assign an alpha channel value to the pixel, which value controls the level of transparency of the pixel, and thus results in an antialiasing effect if the values are provided to the shader of a GPU or other such structure.

The techniques discussed here may, in certain implementations, provide one or more advantages. For example, certain implementations may require far less data than traditional approaches for computing alpha values. Also, the computation of the alpha values may be simplified while still producing adequate quality, so that, for example, the antialiasing computations may occur in software rather than having to be performed in hardware. Such ability can be particularly useful where computational power is limited, such as on small mobile devices.

In one implementation, a computer-implemented method is disclosed that comprises identifying a bit-mapped image of a line or polygon shape; mapping the image to a texture map that is slightly larger in at least one dimension than the bit-mapped image; overlaying the bit-mapped image and the texture map; computing pixel shading for pixels between an outer edge of the bit-mapped image and the texture map by measuring a distance from particular ones of the pixels to a line near an edge of the bit-mapped image; and displaying the bit-mapped image with pixels at its edge shaded according to the computed pixel shading. The texture map may be an integer number of pixels larger than the bit-mapped image around a periphery of the bit-mapped image. Also, the texture map can be an integer number of pixels larger than the bit-mapped image along every peripheral edge of the bit-mapped image. The method can also include determining a rotation angle of the bit-mapped image in three-dimensional space. In addition, the method can include determining a rotation angle of the bit-mapped image in two-dimensional space and identifying endpoints of an edge of the bit-mapped image and creating the line using the identified endpoints.

In certain aspects, the distance is determined based on a distance between a point on a pixel and a point on the line that is closest to the point on the pixel.

In another implementation, a computer-implemented system is disclosed that comprises one or more digital images. The system also comprises an antialiasing module programmed to generate a texture map that is a defined size larger than a first digital image of the one or more digital images to be displayed by the system, and to compute shading values for pixels between an outer edge of the first digital image and an outer edge of the texture map as a function of a distance between a particular pixel and an idealized line near an edge of the first digital image. Moreover, the system comprises a renderer to receive inputs generated from the antialiasing module and to generate a display of the first digital image having antialiased edges.

In some aspects, the texture map is an integer number of pixels larger than the first digital image around a periphery of the first digital image, or an integer number of pixels larger than the first digital image along two opposed edges, but a same dimension as the first digital image along two other opposed edges. In addition, the antialising module can be programmed to determine a rotation angle of the polygon shape in three-dimensional space. Moreover, the antialiasing module can be programmed to determine a rotation angle of the polygon shape in two-dimensional space, and to identify endpoints of an edge of the bit-mapped image and creating the line using the identified endpoints.

In yet another implementation, one or more tangible, recordable storage media have recorded thereon instructions. When the instructions are executed, they perform operations that comprise identifying a shape in the form of a line or polygon to be displayed on a computing device; mapping the shape a texture map that is slightly larger in at least one dimension than the identified shape; overlaying the identified shape and the texture map with each other; computing pixel shading for pixels on the texture map between an outer edge of the identified shape and an edge of the texture map by measuring a distance from particular ones of the pixels to a line near an edge of the identified shape; and displaying the identified shape with pixels at its edge shaded according to the computed pixel shading. The texture map can be an integer number of pixels larger than the identified shape around a periphery of the identified shape, or an integer number of pixels larger than the identified shape along two opposed edges, but a same dimension as the identified shape along two other opposed edges. Also, the operations can include identifying endpoints of an edge of the bit-mapped image and creating the line using the identified endpoints. As another example, the distance can be determined based on a distance between a point on a pixel and a point on the line that is closest to the point on the pixel.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
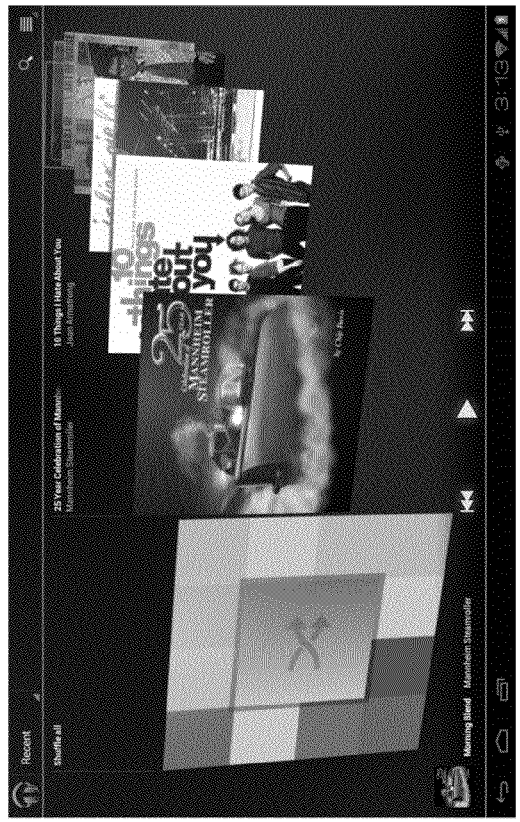
FIGS. 1A and 1B show example screen shots of a media player display having antialiased edges.
Figure 1B:

FIGS. 1A and 1B show example screen shots of a media player display having antialiased edges. In particular, the figure shows a carousel user interface for selecting a media item. FIG. 1A shows a display of books having a slight three-dimensional effect (their edges show to the user), while FIG. 1B shows a display of album covers, and there is still a three-dimensional effect of the albums disappearing into the distance, but side edges are not shown because traditional album sleeves have no appreciable thickness.

Referring now to FIG. 1A, a number of books are shown in a carousel arrangement. The carousel effect is created by angling each of the items as it approaches the left or right edge of the display (and showing the middle item dead on), so that the items appear visually to be moving along a curved path that presents its inside surface in front of the user, and wraps around (off the screen) behind the user's head. The user can pan the carousel left or right to see other titles by dragging a finger on a touch-sensitive display on which the graphics are shown here.

It can be appreciated that the top and bottom edges, at least, of the books will need to be angled very slightly from the horizontal in order to create the three-dimensional visual effect. Such slight angles could create annoying jaggies, particularly by the jaggies changing position on each edge as a user moves the books back and forth.

As shown, the books have depth and dimension. Also, the rightmost and leftmost books can be seen along their edges or spines. Thus, the application for rendering the books may receive from an external source an indication of the number of pages in each of the books, and may create a rectangular model for each book that is proportionate to the number of pages, so that each book will look in the presentation as it would in real life, at least from a thickness perspective. In certain instances (e.g., reference books), a maximum page number may be imposed and any books reported as having more than the maximum will be displayed as if they have the maximum. In a similar manner, whether a book is hardcover or softcover can be determined by the application, and the rendering may differ based on such a determination. For example, the front and back covers may be rendered to overhang the pages for a hardcover book, whereas they may be rendered as being flush (and thinner) for a softcover book.

Referring now to FIG. 1B, there is shown a plurality of album covers in a carousel implementation that takes a slightly different form. As shown here, the carousel disappears off the top right corner of the display and into the distance. The album covers move past the user and effectively over the user's left shoulder as they move off the display in the other direction. Navigation from one album to the next may occur by touch input and dragging or flicking on the albums themselves in one of the two directions for the carousel, or by selecting "backward" and "forward" buttons shown on the display, whose selection will be accompanied by the carousel indexing forward or backward one album cover. Again, to maintain a three-dimensional effect, and because the like of album covers is moving from one side of the display to the other between album covers, the top and bottom edges of the album covers will be angled slightly from the horizontal, and may suffer jaggies, particularly when the background contrasts greatly with the particular album cover. Also, the album covers may be caused to tip slight in the vertical when they are moved, so as to give them a little extra feeling of motion—e.g., when a user drags in a direction on an album, it may tip slight about its lower edge in that direction, so as to give the visual effect that the user is pulling on a physical album.

Thus, each of these applications of a graphical user interface may have need of antialiasing function in order to make the image that the user sees more pleasing visually. The description below discusses example processes and structures that may be employed to provide antialiasing in situations like those shown in these carousels. In applying the techniques below, images for the fronts of books and album covers, and of spines of books, may be obtained, and a computing device may apply a peripheral ring of pixels or texels around the image that results for each such object, where the ring (which may be one pixel wide or several pixels) can be made transparent. The images may then be passed, with a model and information identifying an orientation of the model to a standard graphics processor, which may texture the ring as a blend of adjacent pixels. Also, the system may indicate to the graphics processing that it is supposed to use blending in such a situation. Such actions may occur using well known APIs for particular graphics processors. Particular example techniques are described in more detail below.

The techniques for providing antialiasing along edges of the books, which are described below, may operate satisfactorily in the situations discussed above because the orientation of the books and albums relative to the viewer is relatively fixed. In particular, if a transparent ring were provided around an image for a spine, and a user were able to rotate the book for viewing from the spine end, the user may see a transparent vertical line along each side of the spine. A light colored background could bleed through that line. Such an issue could be particularly annoying if the user rotated the book back and forth through that particular orientation. However, where the orientation of the books (or albums) is restricted to being almost completely front-on, such problems do not arise, and the antialiasing discussed here and claimed below may provide a visually appealing representation of the 3D models of the books and albums as they are moved back and forth along the curve of the carousel.

Figure 2:
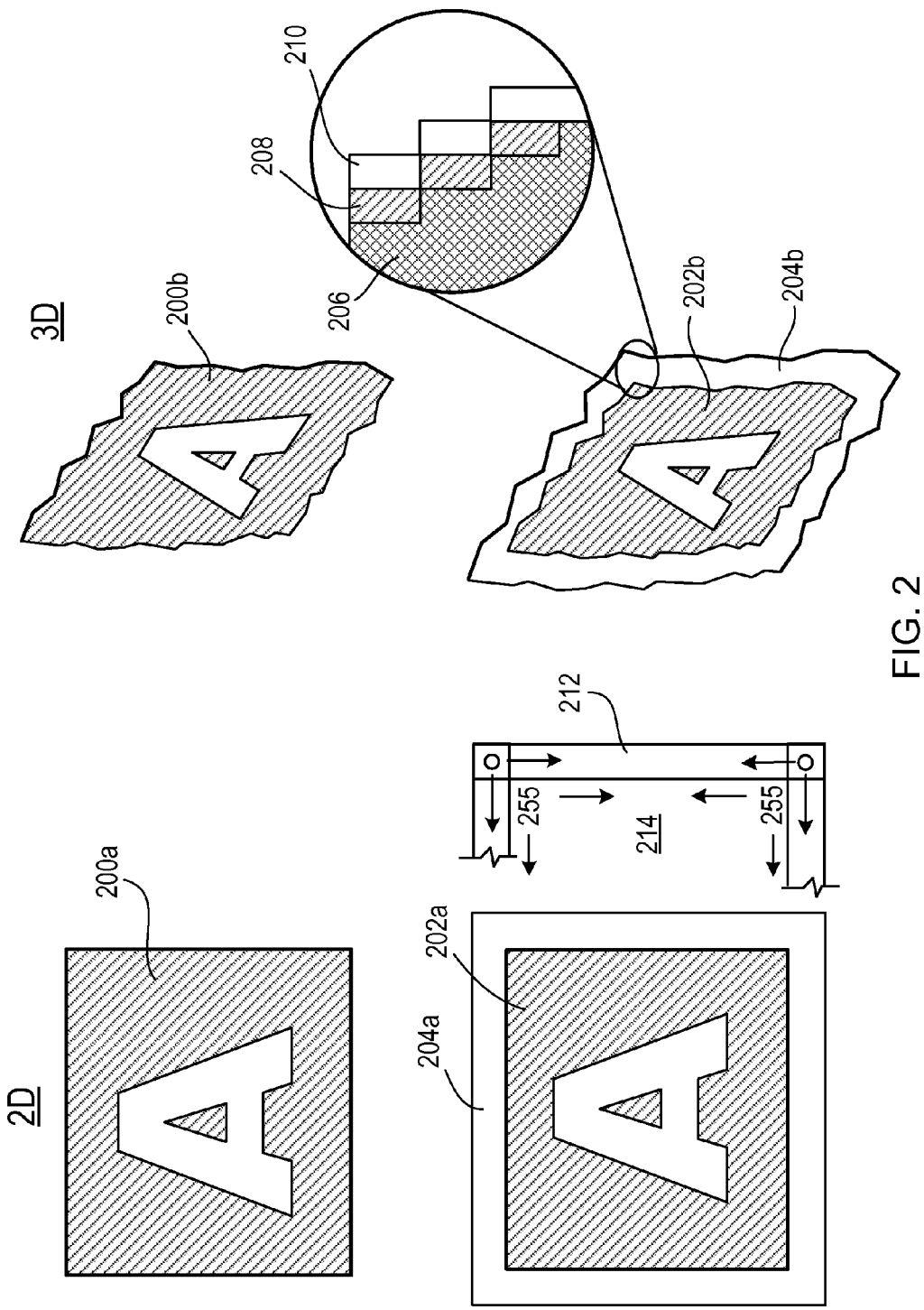
FIG. 2 is a depiction of antialiasing performed on a square bitmapped image.

FIG. 2 is a depiction of antialiasing performed on a square bitmapped image, such as the front of an album cover or front of a book as shown in FIGS. 1A and 1B. An image 200*a* in the figure represents a basic bit-mapped image. The image may take any appropriate form, and in this example may be considered to be a piece of album cover art that is to be displayed on a computing device and to be scrollable through what appears to a viewer of the device to be a circular or arced carousel (e.g., if the user swipes on a touchscreen with her finger to spin the carousel), like those of FIGS. 1A and 1B. Such rotation of the carousel may cause individual album covers, made up of various different bit maps, to rotate in three dimensional space slightly. As a result, the edges of the image become slightly angled relative to vertical and horizontal as shown by rotated image 200*b*.

The lower portion of the figure shows an example for removing the "jaggies" shown at the edge of image 200*b* by the use of a lightweight antialiasing technique. This technique may be used in computing alpha values for pixels at and around the edge of an image during any particular point in its motion (and can be updated every time the image is moved and thus needs to be re-rendered).

Specifically, a texture map 204*a* may be generated that is slightly larger than the image 202*a*, such as by being one or two pixels wider and taller on each edge (so four pixels larger in each dimension). The map 204*a* may be the same size as image 200*a*, and image 204*a* may simply be a version of image 200*a* that has been shrunk in each dimension by two to four pixels. The image 200*a* may also be referred to more generally as a polygon, and the techniques described here may more generally be performed along each edge of the polygon (generally external peripheral edges for solid polygons having no holes in them).

The polygon has texture coordinates that are chosen so that the texture coordinates of the polygon are mapped to match the generated texture including border pixels. Such selection of texture coordinates may be relevant in situations in which the polygon does not map to the entire area of the texture.

In the middle in the lower portion of the figure, the alpha shading values for the texture map are shown. In particular, the portion of the map 204*a* that is outside the edge of the image may be given a value of 0, for transparent. In contrast, portions of the texture map 204*a* that overlap with the shrunken image 202*a* may be entirely opaque, with a value of 255. Thus, if the combination were rendered at this point, it would look simply like the figure, since the main part of the figure would be fully rendered and the area around the edge would be invisible, or fully transparent.

The lower right rendition shows the image rotated in three dimensional space, with antialiasing performed along the edges of the image. In particular, the jaggies on the image 202*b* have been smoothed by filling in particular pixels between the edge of the image 202*b* and the texture map 204*b* and by shading the pixels. In particular, the previously transparent pixels with an alpha of 0 may be provided with a positive alpha value that causes them to be less transparent and more opaque. Such a "middle ground" transparency may result in a visual softening of the edge of the image—an antialiasing effect.

The level of shading, via the selected alpha value, may be a function of each pixel's distance from a hypothetical or idealized line that may run along an edge of the image, such as the outer edge of the sawteeth that is created by the jaggies or an inner edge of the sawteeth. The ideal line may also be offset from those positions and shading values may be adjusted accordingly so as to create a shading process that properly antialiases the edge. Thus, various approaches may be made for determining the distance, which may be measured by an absolute or relative value, such as a normalized value set between 0 and 1. Such value may then be resolved into an alpha value (or the alpha value itself may be from 0 to 1), where a greater distance from the ideal line away from the object receives a lower value (a value that is closer to transparent).

The calculation of alpha values may thus be performed for each of the pixels along an edge (and measured form an ideal line), and for pixels along other edges in need of antialiasing (and thus measured from other ideal lines). In certain circumstances, the alpha value for a pixel may be inferred from values of other pixels such as its neighboring pixels, rather than computing its value directly from its distance from the ideal line.

The solid portion of the image is shown by 206 in the blown-up area, while the shaded pixel is shown at 208, and a portion of the texture map that was left transparent (and would not be visible when the image is displayed on a computer) is shown by 210. In other implementations where there are multiple rows of pixels outside the outer edge of the underlying polygon or image, each of the rows may have a progressively lower alpha value as they move away from the edge and into free space. Such a process may result in the edge being softer, but also smoother. The final antialiased image may, in practice, be generated by a graphical processing unit (GPU) that may operate according to a standard such as OpenGL ES 1.0, 2.0, and OpenGL. The alpha calculations may be performed separately, such as on a general microprocessor executing software for computing the alpha values in the manner discussed here. The alpha values and other information needed for generating the image may then be passed to the GPU. Such operations may be performed each time an item such as the image 200a is moved on a display (e.g., if a user rotates one of the carousels in FIGS. 1A or 1B slightly, the antialiasing would be performed again to reflect the new angles of the edge s of the objects shown in the carousels).

Thus, by this general technique, antialiasing may be performed in a lightweight manner, particularly for situations in the object whose edges are being antialiased is constrained in its level of rotation so that it stays close to a straight-on orientation on a display of a computer. The following figure provides additional discussion for the performance of computing alpha values around the edge of an object such as a polygon to be displayed on a computer.

Figure 3:
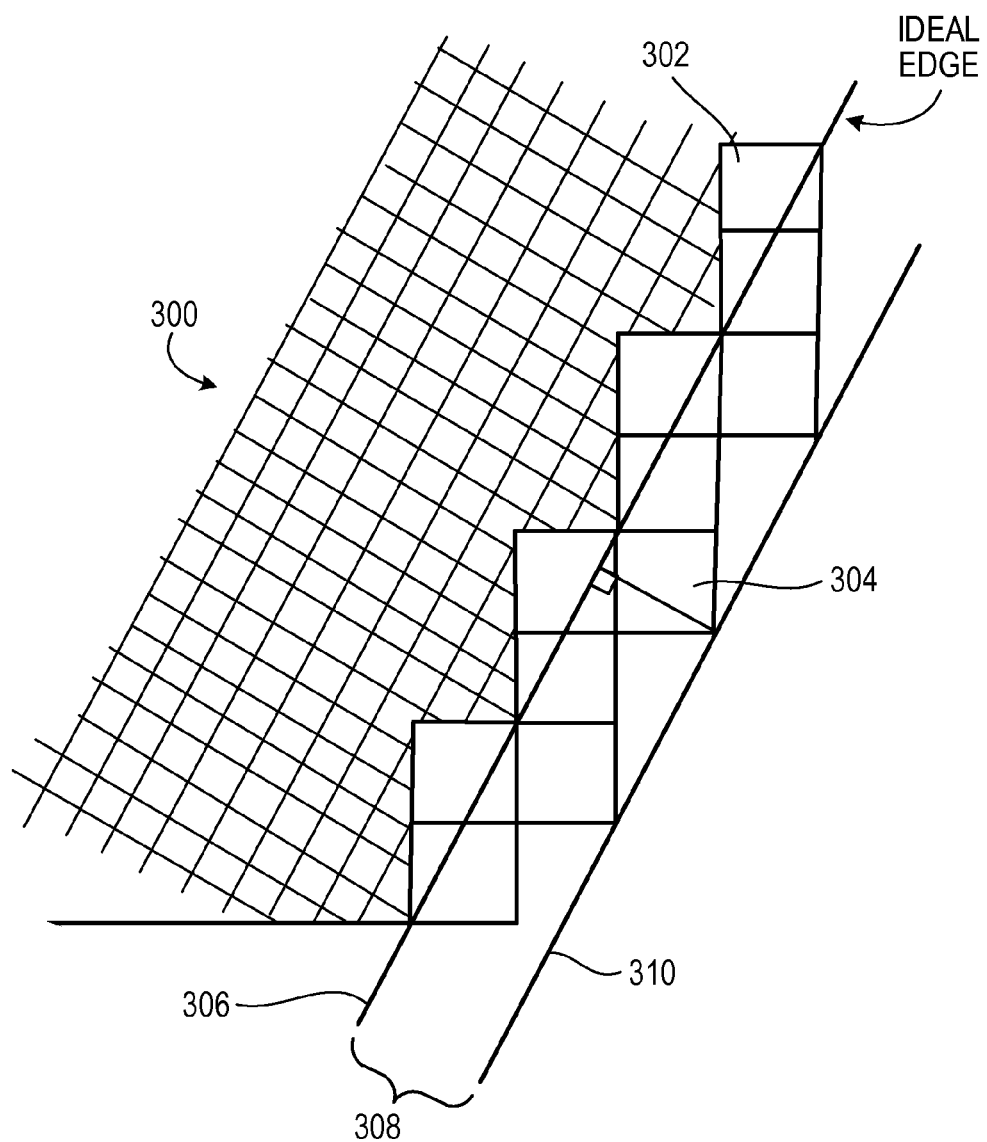
FIG. 3 is a close-up showing antialiasing calculations for an edge of a polygon.

FIG. 3 is a close-up showing antialiasing calculations for an edge of a polygon. The computations are similar to those shown in FIG. 2, but are described here in more detail. Generally, this view better shows hypothetical lines that may be drawn and the computation of pixels in an antialiasing area. The left line 306 is termed an ideal edge, and at that point, alpha is equal to 1. The line 306 is not actually displayed, but is instead a construction line used for performing geometric calculations that can lead to the generation of alpha values for pixels in the texture map. The right line 310 is the polygon edge where the alpha value is 0. The polygon edge is rendered in the area between the lines, and the alpha is computed according to the distance between the line 306 (or another appropriate line) and the particular pixel that is being provided a transparency value. The location of the pixel may be taken at the middle of the pixel or at another location on or off of the pixel, as long as the selected location allows a determination to be made about the pixels relative distance from the lines 306 or another appropriate location that provides an indication of how far the pixel is from the outer edge of the polygon.

Pixel 304, for example, shows the computation of alpha as a function of a distance to the idealized edge, which value may be normalized into a range from 0 to 1. The function is ideally related to a projected distance in screen space—approximated in the texture map with the N-pixel border in texture, where alpha=0. The value of N is selected to relate to a worst case (smallest) projected polygon for a process. A large N results in fuzzy edges and needs to be optimized for a given application. Such selection may be made to lessen potential problems of the projection minimizing the textures. For example, when the projected area of a polygon is less than the area of the texture map, OpenGL will apply a user-defined minimization filter that may skip over idealized border pixels. As a particular example, if the area is 2:1 reduced, then two border pixels may be needed. A 4:1 reduction would require four border pixels.

Also, although the distance computation is shown here as a distance from a point on the pixel to a closest point on the line 306 (which results in a right angle with the line), the distance measurement made be made by other techniques that still result in the relative distance of a pixel from the edge of the polygon being a factor or the factor in an alpha value that is assigned to the pixel (and potentially to other, neighboring pixels).

Figure 4:
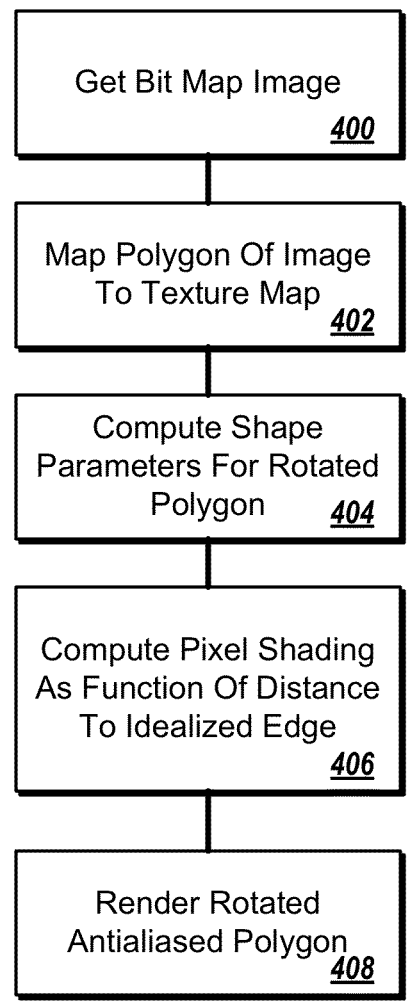
FIG. 4 is a flow chart of an antialiasing process.

FIG. 4 is a flow chart of an antialiasing process. The process begins at box 400, where a bit-mapped image (or other form of polygon) is obtained. For example, in an album art carousel example, images that represent album covers may be obtained from local or remote storage and may be provided for display on a device.

The process then, at box 302, maps texture maps to the relevant images. An image may be determined to be relevant if it has an edge that is at an angle to horizontal or vertical, such that the edge requires antialiasing. As described above, the texture maps may be selected to be N pixels larger on one or more sides of the image, than is the image in size. Alternatively, an image map may be selected that has an area that matches the image or other form of polygon, and the image may be reduced in size by several pixels At box 404, the process computes shape parameters for the rotated polygon, so as to generate a set of pixels that represents the unantialiased shape. Such computation may involve identifying the coordinates of edges of the rendered object, whether as straight lines or curves. Upon identifying the coordinates, the process may determine which edges are at an angle that might require the provision of antialiasing. The shading for pixels along the jaggies, in the antialiasing region, may then be computed in the manners discussed above, according to a function of their distance from an idealized line that is set up a determined distance from an edge (e.g., the outer or inner edge of the sawteeth along the image) along the outer edge of the polygon.

The rotated and antialiased polygon is then rendered and displayed at box 408. Such operations may use a variety of forms of hardware and use data derived form the foregoing steps of the process.

Figure 5:
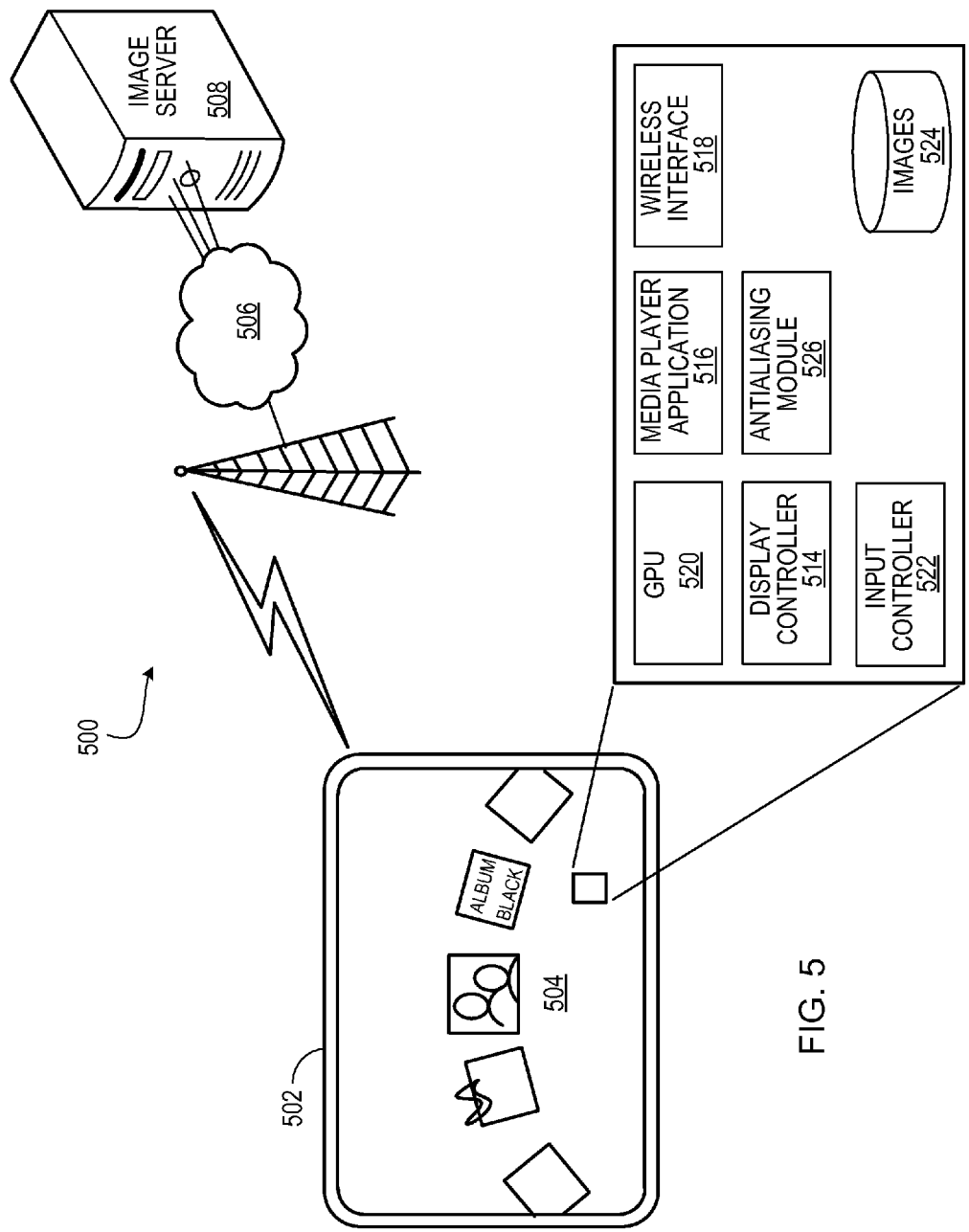
FIG. 5 is a schematic diagram of a system for displaying antialiased objects.

FIG. 5 is a schematic diagram of a system 500 for displaying antialiased objects. In general, the system 500 allows a computer device, such as a portable device 502, to present information via a graphical user interface, where the edges of displayed objects may be antialiased according to the techniques described above.

Referring now more specifically to components of the system 500, the device 502 is arranged to communicate through a wireless network and then the network 506, such as the Internet, with various hosted services. In this example, the hosted service that is being used is an image service provided by image server 508. Interaction between computing devices and an image server system is well-known and may include the receipt of image files by the device 502, where the file may include a header that identifies meta data and a body of the file defines data for generating the image on a display. In some examples, the images may be of album cover art and may be accessed for display on the device 502.

The device 502 has been loaded with a media player application 516 for playing media files such as songs and movies on the device 502, and also for allowing a user to select items for playing via a carousel interface on a display 504 of the device. Other applications on the device may require antialiasing for other purposes, and the media player application 516. is discussed here for purposes of illustration only.

The display 504 on the device 502 shows album covers in the carousel display, similar to the displays in FIGS. 1A and 1B, where individual album covers are rotated as the carousel is moved.

Particular components shown in schematic form as executing on the device 502 may affect the manner in which the application 516 is displayed on the device 502. For example, a display controller 514 may control the manner in which different applications access the display of device 502, and the manner in which their content is displayed on that display.

For example, the display controller 514 may identify which application is currently the focus of the device 502 and may display content from that application in preference to content from other applications. The display controller 514 may also identify which user interface elements, such as elements generated by particular activities of an application, are to be displayed at a current time on the display of device 502.

An input controller 522 may interact with the display controller 514 and may identify various inputs received on the device 502. Such input, for example, may include touch-based inputs on a touch sensitive portion of the display on device 502. The location of a particular touch input as sent by the input controller 502 may be coordinated with locations of items in the user interface displayed by the display controller 514, so that a user intention for a touch input may be discerned. For example, a user dragging on the albums in the carousel may be identified as relating to a user intent to rotate the images through the curve of the carousel, and to fetch and display additional images that are not currently being displayed.

An antialiasing module 526 is also provided on the device 502 and may interact with the display controller 514 and a GPU 520 to provide antialiasing of edges on objects that are displayed by various applications executing on the device 502. The antialiasing module may obtain information that defines the locations and angles of edges, and may construct ideal lines along such edges, generate texture maps having different alpha values at different locations on the maps, and identify alpha values to apply to the maps based on the distances of particular pixels or groups of pixels as a function of the distance of those pixels from the outer edge of the object that is being antialiased. The antialiasing module 526 may, for example, use techniques like those discussed above for FIGS. 2 and 3.

The antialiasing module may execute on a microprocessor on the device 502, and the microprocessor may pass alpha values and other relevant information about the rendering process to the GPU 520. The GPU may then operating in a standard manner to turn such information into a rich display that can be shown on the device 502.

A wireless interface 518 may be used to receive image data and send such data back and forth to the image server 508 through the network 506. The media player application 516 may be programmed according to an application programming interface to access information that is passing through the wireless interface 518. For example, the media player application 516 may register with an operating system that is executing on the device 502 to be notified when images are received from the image server 506 and to be provided with data from such messages so that they can be displayed on the device 502 in a quickly-updated manner.

An images database 524 may also be the source of images to be displayed on the device 502. The database 524 may store images persistently or may cache images obtained from image server 506. For example, if a user of the media application 516 performs a search for "U2," images for each of the albums made by the band U2 may be pre-fetch, and five of those images may be shown immediately on the display 504. As the user manipulates the carousel, other of the images may be obtained from the database 524, and antialiasing may be performed on whatever images are currently being displayed.

In this manner, the system 500 can display a variety of items and provide an improved visual display through a relatively lightweight process for antialiasing edges of objects that are displayed. The antialiasing service may be provided for all applications, for only those that request it (with an understanding that the particular type of antialiasing may not be appropriate for all uses), or only to predefined applications, including by incorporating the antialiasing into the code for the application itself. As a result, the system 500 may significantly improve the operation of device 502 and the experience of a user of the device 502 without substantial additional overhead being needed on the device 502.

Figure 6:
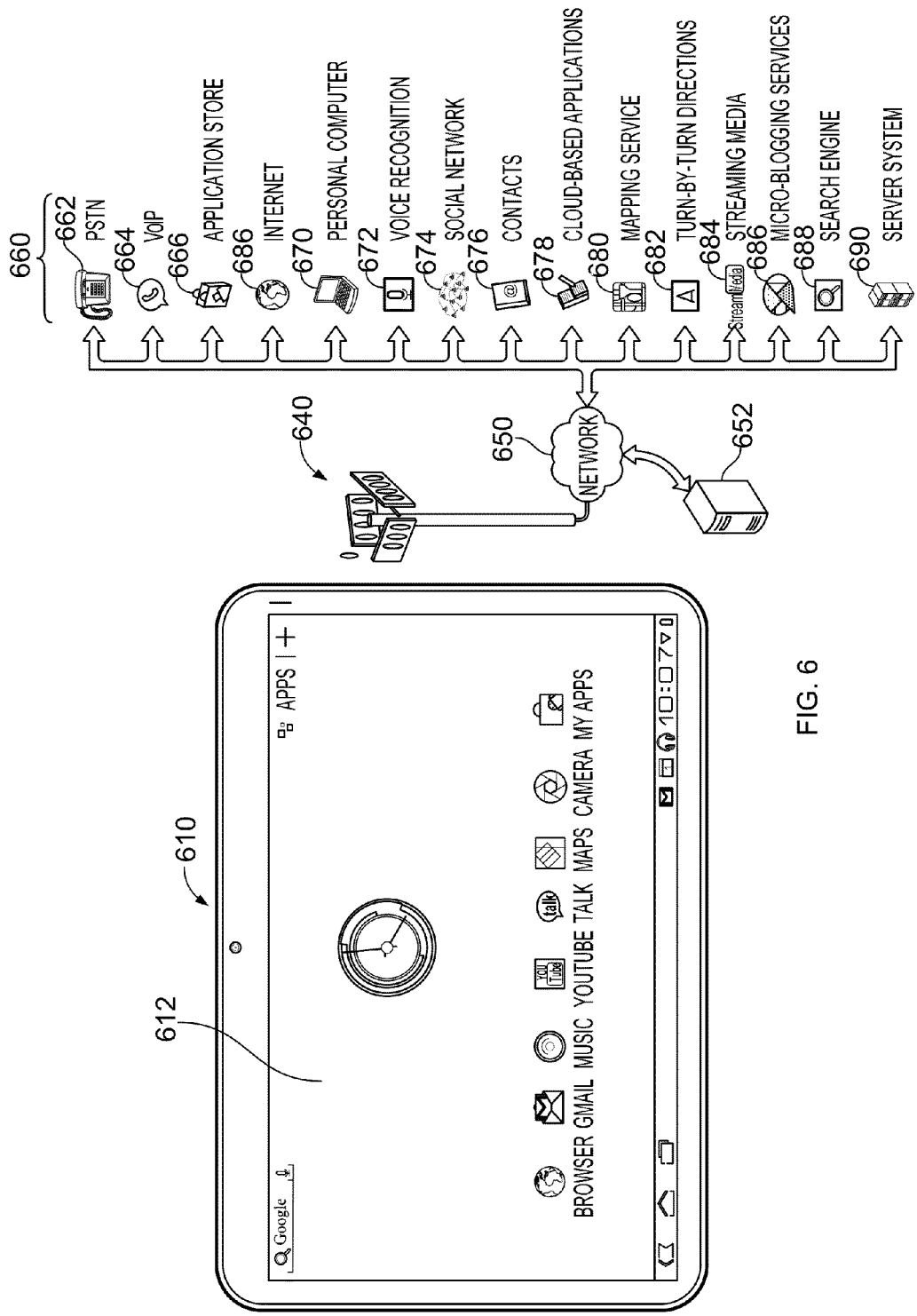
FIGS. 6 and 7 show examples computer devices that can be used to implement the techniques described here.

Referring now to FIG. 6, a conceptual diagram of a system that may be used to implement the systems and methods described in this document is illustrated. In the system, a computing device 610 can wirelessly communicate with base station 640, which can provide the mobile computing device with wireless access to numerous hosted services 660 through a network 650.

In this illustration, the mobile computing device 610 is depicted as a tablet device that includes a touchscreen display 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard, physical buttons, trackballs, accelerometers, gyroscopes, and magnetometers).

Example visual output mechanism in the form of display device 612 may take the form of an LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a mobile telephone, a slate computer, a personal digital assistant, an embedded system (e.g., a car navigation system), a desktop personal computer, or a computerized workstation.

An example mechanism for receiving user-input includes a "virtual" keyboard displayed on the touchscreen display 612 or a physical keyboard (not shown), which may be a full qwerty keyboard or a traditional keypad that includes keys for the digits '0-9', '*', and '#.' The keyboard receives input when a user physically contacts or depresses a keyboard key. User manipulation of a trackball or interaction with a trackpad enables the user to supply directional and rate of rotation information to the device 610 (e.g., to manipulate a position of a cursor on the display device 612).

The device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive physical buttons (not shown). Additionally, the mobile computing device may include buttons for adjusting volume output by the one or more speakers (not shown), and a button for turning the mobile computing device on or off. A microphone allows the device 610 to convert audible sounds into an electrical signal that may be digitally encoded and stored in computer-readable memory, or transmitted to another computing device. The device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard. User-selection of the button may invoke the pre-defined action.

In some examples, the operating system provides a "desktop" user interface that is displayed upon turning on the computing device 610, activating the device 610 from a sleep mode, upon "unlocking" the mobile computing device 610, or upon receiving user-selection of a physical button on the computing device 610. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 812 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The computing device 610 may include other application modules and hardware. Where the computing device 610 is a mobile telephone, a call handling unit may receive an indication of an incoming telephone call and provide a user capabilities to answer the incoming telephone call. A media player may allow a user to listen to music or play movies that are stored in local memory of the computing device 610. The device 610 may include a digital camera sensor, and corresponding image and video capture and editing software. An internet browser may enable the user to view content from a web page by typing in an addresses corresponding to the web page or selecting a link to the web page.

The computing device 610 may include an antenna to wirelessly communicate information with the base station 640. The base station 640 may be one of many base stations in a collection of base stations (e.g., a mobile telephone cellular network) that enables the computing device 610 to maintain communication with a network 650 as the computing device 610 is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 560. Although the services 660 may be provided over different networks (e.g., the service provider's internal network, the Public Switched Telephone Network, and the Internet), network 650 is illustrated as a single network. The service provider may operate a server system 652 that routes information packets and voice data between the computing device 610 and computing devices associated with the services 660.

The network 650 may connect the computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the computing device 610. Conversely, the computing device 610 may send a communication to the service provider server system 652 initiating a telephone call with a telephone number that is associated with a device accessible through the PSTN 662.

The network 650 may connect the computing device 610 with a Voice over Internet Protocol (VoIP) service 664 that routes voice communications over an IP network, as opposed to the PSTN. For example, a user of the computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the computing device 610 the ability to browse a list of remotely stored application programs that the user may download over the network 650 and install on the computing device 610. The application store 666 may serve as a repository of applications developed by third-party application developers. An application program that is installed on the computing device 610 may be able to communicate over the network 650 with server systems that are designated for the application program. For example, a VoIP application program may be downloaded from the Application Store 666, enabling the user to communicate with the VoIP service 664.

The computing device 610 may access content on the internet 668 through network 650. For example, a user of the computing device 610 may invoke a web browser application that requests data from remote computing devices that are accessible at designated universal resource locations. In various examples, some of the services 660 are accessible over the internet.

The computing device 610 may communicate with a personal computer 670. For example, the personal computer 670 may be the home computer for a user of the computing device 610. Thus, the user may be able to stream media from his personal computer 670. The user may also view the file structure of his personal computer 670, and transmit selected documents between the computerized devices.

A voice recognition service 672 may receive voice communication data recorded with the computing device's microphone (not shown), and translate the voice communication into corresponding textual data. In some examples, the translated text is provided to a search engine as a web query, and responsive search engine search results are transmitted to the computing device 610.

The computing device 610 may communicate with a social network 674. The social network may include numerous members, some of which have agreed to be related as acquaintances. Application programs on the computing device 610 may access the social network 674 to retrieve information based on the acquaintances of the user of the mobile computing device. For example, an "address book" application program may retrieve telephone numbers for the user's acquaintances. In various examples, content may be delivered to the computing device 610 based on social network distances from the user to other members. For example, advertisement and news article content may be selected for the user based on a level of interaction with such content by members that are "close" to the user (e.g., members that are "friends" or "friends of friends").

The computing device 610 may access a personal set of contacts 676 through network 660. Each contact may identify an individual and include information about that individual (e.g., a phone number, an email address, and a birthday). Because the set of contacts is hosted remotely to the computing device 610, the user may access and maintain the contacts 676 across several devices as a common set of contacts.

The computing device 610 may access cloud-based application programs 678. Cloud-computing provides application programs (e.g., a word processor or an email program) that are hosted remotely from the computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the computing device 610 with street maps, route planning information, and satellite images. An example mapping service is GOOGLE MAPS. The mapping service 680 may also receive queries and return location-specific results. For example, the computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the computing device 610. For example, computing device 610 may request a stream for a pre-recorded video file, a live television program, or a live radio program. Example services that provide streaming media include YOUTUBE and PANDORA.

A micro-blogging service 686 may receive from the computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
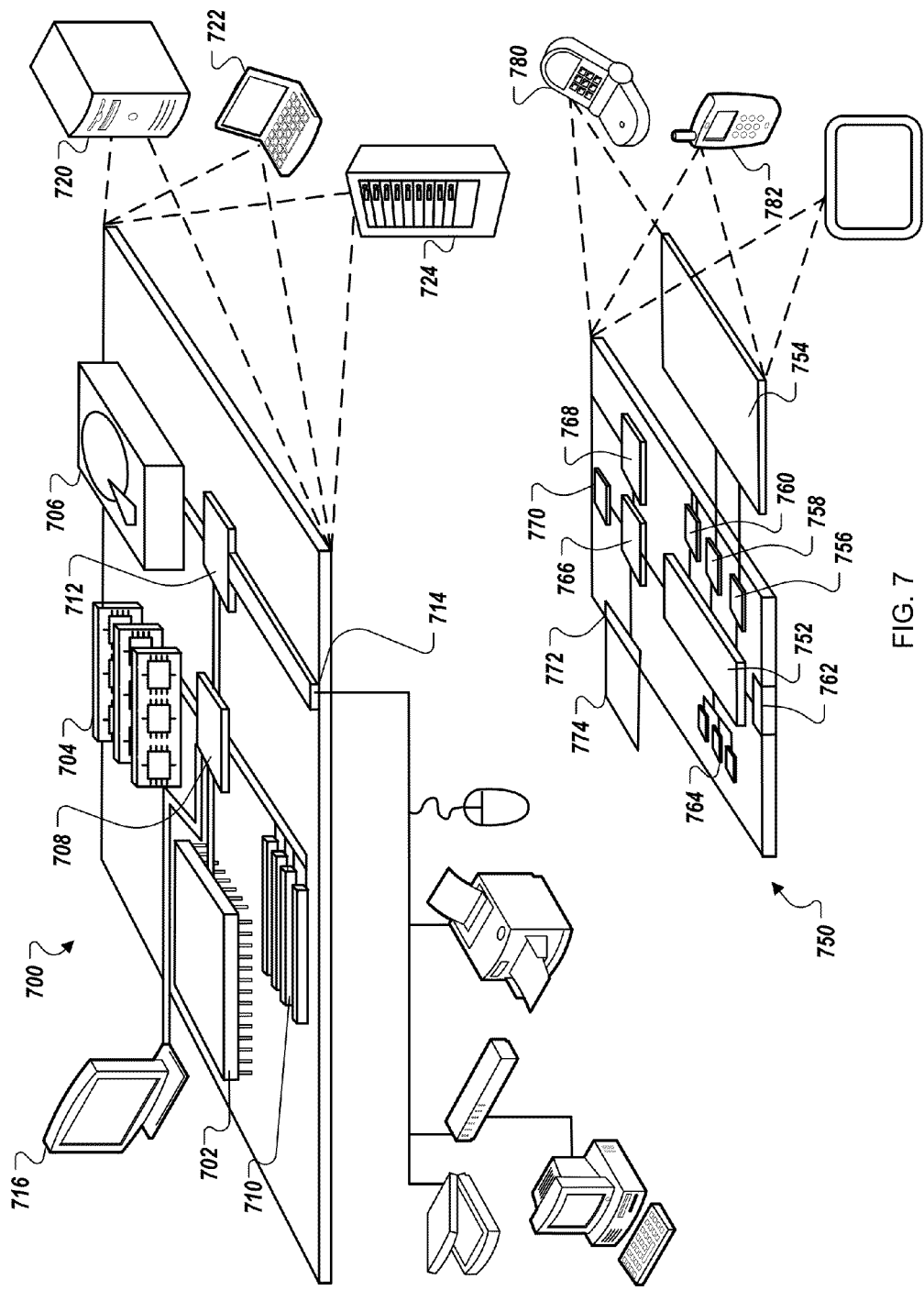

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as tablet devices, personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. The device may be provided with a subscriber identity module (SIM) card that stores a key for identifying a subscriber with a telecommunications carrier to enable communication through the carrier. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, tablet device 784, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular shapes or type of images, but other visible items that are rendered may also be provided with antialiasing.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
    identifying a bit-mapped image of a line or polygon shape, the image including a plurality of pixels;
    mapping the bit-mapped image to a texture map that is larger in at least one dimension than the bit-mapped image;
    overlaying the bit-mapped image and the texture map;
    computing pixel shading for pixels between an outer edge of the bit-mapped image and the texture map by measuring a distance from particular ones of the pixels to a line near an edge of the bit-mapped image; and
    displaying the bit-mapped image with the pixels between an edge of the bit-mapped image and an edge of the texture map at its edge shaded according to the computed pixel shading,
    wherein the texture map is an integer number of pixels larger than the bit-mapped image in the at least one dimension.

2. The computer-implemented method of claim 1, wherein the texture map is an integer number of pixels larger than the bit-mapped image along every peripheral edge of the bit-mapped image.

3. The computer-implemented method of claim 1, further comprising determining a rotation angle of the bit-mapped image in three-dimensional space.

4. The computer-implemented method of claim 1, further comprising determining a rotation angle of the bit-mapped image in two-dimensional space.

5. The computer-implemented method of claim 1, further comprising identifying endpoints of an edge of the bit-mapped image and creating the line using the identified endpoints.

6. The computer-implemented method of claim 1, wherein the distance is determined based on a distance between a point on a pixel and a point on the line that is closest to the point on the pixel.

7. A computer-implemented system, comprising:
one or more processors;
storage accessible by the one or more processors and storing one or more digital images that each include a plurality of pixels;
an antialiasing module programmed to execute on the one or more processors to:
generate a texture map that is made up of pixels and is a defined size larger than a first digital image, of the one or more digital images, to be displayed by the system, and
compute shading values for pixels between an outer edge of the first digital image and an outer edge of the texture map as a function of a distance between a particular pixel and an idealized line near an edge of the first digital image; and
a renderer to receive inputs generated from the antialiasing module and to generate a display of the first digital image having antialiased edges,
wherein the texture map is an integer number of pixels larger than the bit-mapped image in the at least one dimension.

8. The computer-implemented system of claim 7, wherein the texture map is an integer number of pixels larger than the first digital image along two opposed edges, but a same dimension as the first digital image along two other opposed edges.

9. The computer-implemented system of claim 7, wherein the antialising module is programmed to determine a rotation angle of the polygon shape in three-dimensional space.

10. The computer-implemented system of claim 7, wherein the antialiasing module is programmed to determine a rotation angle of the polygon shape in two-dimensional space.

11. The computer-implemented system of claim 7, wherein the antialiasing module is programmed to identify endpoints of an edge of the bit-mapped image and creating the line using the identified endpoints.

12. The computer-implemented system of claim 7, wherein the distance is determined based on a distance between a point on a pixel and a point on the line that is closest to the point on the pixel.

13. One or more non-transitory recordable storage media having recorded thereon instructions that, when executed, perform operations comprising:
identifying a shape in the form of a line or polygon to be displayed on a computing device;
mapping the shape to a texture map that is larger in at least one dimension than the identified shape;
overlaying the identified shape and the texture map with each other;
computing pixel shading for pixels on the texture map between an outer edge of the identified shape and an edge of the texture map by measuring a distance from particular ones of the pixels to a line near an edge of the identified shape; and
displaying the identified shape with pixels at its edge shaded according to the computed pixel shading,
wherein the texture map is an integer number of pixels larger than the identified shape in at least one dimension.

14. The non-transitory recordable storage media of claim 13, wherein the texture map is an integer number of pixels larger than the identified shape along two opposed edges, but a same dimension as the identified shape along two other opposed edges.

15. The non-transitory recordable storage media of claim 13, wherein the operations further comprise identifying endpoints of an edge of the identified shape and creating the line using the line using the identified endpoints.

16. The non-transitory recordable storage media of claim 13, wherein the distance is determined based on a distance between a point on a pixel and a point on the line that is closest to the point on the pixel.

17. The non-transitory recordable storage media of claim 13, wherein the texture map covers a plurality of separate identified shapes at the same time.

* * * * *